US012358438B2

(12) United States Patent
Tietje

(10) Patent No.: US 12,358,438 B2
(45) Date of Patent: Jul. 15, 2025

(54) HOLDING DEVICE FOR A MOTOR VEHICLE SENSOR SYSTEM AND MOTOR VEHICLE COMPRISING A HOLDING DEVICE

(71) Applicant: Volkswagen Aktiengesellschaft, Wolfsburg (DE)

(72) Inventor: Alexander Tietje, Wesendorf (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 173 days.

(21) Appl. No.: 18/485,705

(22) Filed: Oct. 12, 2023

(65) Prior Publication Data

US 2024/0123915 A1  Apr. 18, 2024

(30) Foreign Application Priority Data

Oct. 13, 2022  (DE) .................. 102022210830.2

(51) Int. Cl.
*B60R 11/04* (2006.01)
*B60R 11/00* (2006.01)
*B60R 19/48* (2006.01)

(52) U.S. Cl.
CPC ............ *B60R 11/04* (2013.01); *B60R 19/483* (2013.01); *B60R 2011/0087* (2013.01)

(58) Field of Classification Search
CPC .............. B60R 11/04; B60R 19/483; B60R 2011/0087; B60R 2011/0026; B60R 11/00; B60R 19/52; B60R 21/013; B60R 2011/0042; G01D 11/30
See application file for complete search history.

(56) References Cited

U.S. PATENT DOCUMENTS

| 11,203,313 | B2* | 12/2021 | Momii ................. G01S 13/931 |
| 11,285,897 | B2 | 3/2022 | Schulz |
| 2011/0155874 | A1* | 6/2011 | Roehr .................. B60S 1/0881 |
| | | | 248/220.21 |
| 2020/0264267 | A1 | 8/2020 | Gligor et al. |
| 2022/0413130 | A1* | 12/2022 | Kaiser .................. G01S 13/931 |

FOREIGN PATENT DOCUMENTS

| DE | 202011052507 U1 | 4/2013 |
| DE | 102017009057 A1 | 3/2019 |
| DE | 102020116494 B3 | 8/2021 |
| DE | 102019134861 B4 | 3/2022 |

\* cited by examiner

*Primary Examiner* — Michael E Teitelbaum
(74) *Attorney, Agent, or Firm* — Peter Zura; LOZA & LOZA, LLP

(57) ABSTRACT

A holding device for a motor vehicle sensor system, including a frame attached to a structural element of a motor vehicle and a sensor holder configured to hold sensors. First/second pivoting brackets are mounted on first/second sides of the frame to be pivotable about a first/second pivot axis. First/second guide element of the first/second pivoting bracket are accommodated in at least one first/second guiding receptacle of the sensor holder. A pre-tensioning mechanism pre-tensions the first/second pivoting brackets into a usage position by applying a predetermined force onto the sensor holder to overcome the pre-tension so that the sensor holder can be lowered along a movement direction in the direction of the frame, such that a first distance between the first pivot axis and the second pivot axis is smaller than a second distance between the at least one guiding receptacle and the at least one second guiding receptacle.

20 Claims, 11 Drawing Sheets

HOLDING DEVICE FOR A MOTOR VEHICLE SENSOR SYSTEM AND MOTOR VEHICLE COMPRISING A HOLDING DEVICE

RELATED APPLICATIONS

The present application claims priority to German Pat. App. No. DE 10 2022 210 830.2 filed Oct. 13, 2022, the contents of which are incorporated by reference in its entirety herein.

TECHNICAL FIELD

The present disclosure relates to a holding device for a motor vehicle sensor system, comprising a frame that can be attached to a structural element of a motor vehicle and a sensor holder configured to hold sensors. The present disclosure furthermore relates to a motor vehicle comprising a holding device for a motor vehicle sensor system.

BACKGROUND

In modern motor vehicles, the sensors of various driver assistance systems are usually arranged in the grille beneath the vehicle cross member. Sensors should be configured such that they cannot be damaged by the effects of minor impacts that may occur during rear-end collisions at low speed, so that the driver assistance systems can be reliably precluded from failure. Furthermore, a loss of function as a result of a sensor displacement is to be avoided.

For protection, the sensors are therefore usually attached to a cross member of the vehicle. The motor vehicle then must have a sufficiently large vehicle overhang, so that the sensors of the vehicle sensor system are not damaged during an accident-induced deformation of the front of the vehicle. It is furthermore known from the prior art to install the vehicle sensor system in the concealed area of the cross member for protection against damage, wherein, however, the conical beam shape of some sensors necessitates considerably larger clearances in the grille to ensure an unobstructed view of the sensors. In addition, the ventilation cross-section is limited when the sensors are arranged in the grille, which can disadvantageously affect the cooling performance of the radiators.

A sensor array at a vehicle is known from DE 10 2019 134 861 B1, comprising a connecting system, which connects a holding device to at least one vehicle component so as to be movable between an operating position and at least one protecting position, wherein the holding device accommodates a sensor, wherein a collision force caused by another party involved in the collision includes a first force component acting in a first spatial direction, which proportionately moves the holding device in the direction of the corresponding first spatial direction into the at least one protecting position, wherein a restoring force of at least one restoring system transfers the holding device from the at least one protecting position into the operating position, and wherein the first spatial direction corresponds to a vehicle longitudinal direction, wherein the connecting system includes at least one lever system, which additionally converts at least one force component of the collision force which acts in a further spatial direction into a proportional movement of the holding device in the corresponding spatial direction, and wherein the at least one lever system transfers the holding device in a resulting direction of action of the collision force into the at least one protecting position.

DE 10 2020 116 494 B3 discloses a motor vehicle comprising a bumper assembly including a cross member and a body shell component having an opening, as well as comprising a sensor device, which is held by way of a holding device, wherein a support device is arranged between the body shell component and the cross member, which is arranged at the body shell component and, when installed, has a first distance with respect to the cross member and a second distance with respect to the holding device, wherein the second distance is greater than the first distance so that the body shell components are supported at the cross member, but not at the holding device, during a predefined crash.

SUMMARY

Aspects of the present disclosure are directed to providing a device for a motor vehicle sensor system, by means of which damage or a displacement of sensors of the motor vehicle sensor system is avoided in the event of an accident at low speeds and which, at the same time, allows shorter vehicle overhangs and larger ventilation cross-sections to be implemented.

In some examples, a holding device for a motor vehicle sensor system is disclosed, comprising a frame that can be attached to a structural element of a motor vehicle, and a sensor holder configured to hold sensors, a first pivoting bracket being mounted at a first side of the frame so as to be pivotable about a first pivot axis, and a second pivoting bracket being mounted at a second side of the frame, located opposite the first side, so as to be pivotable about a second pivot axis, a first guide element of the first pivoting bracket being accommodated in at least one first guiding receptacle of the sensor holder, and a second guide element of the second pivoting bracket being accommodated in at least one second guiding receptacle of the sensor holder, a pre-tensioning mechanism being provided, the pre-tensioning mechanism being configured to pre-tension the first pivoting bracket and the second pivoting bracket into a usage position, it being possible, by applying a predetermined force onto the sensor holder, to overcome the pre-tension so that the sensor holder can be lowered along a movement direction in the direction of the frame, and it furthermore being provided that a first distance between the first pivot axis and the second pivot axis is smaller than a second distance between the at least one guiding receptacle and the at least one second guiding receptacle.

The motor vehicle sensor system can comprise sensors for driver assistance systems or other functions of the motor vehicle. The sensors can be attached to the sensor holder of the holding device.

In some examples, a motor vehicle is disclosed, comprising the holding device described herein.

Preferably, it may be provided that the holding device of the motor vehicle is attached to a cross member and/or a lower load plane of the motor vehicle.

BRIEF DESCRIPTION OF THE DRAWINGS

Aspects of the present disclosure will be described hereafter based on the accompanying figures. In the drawings.

DETAILED DESCRIPTION

Figure 1:
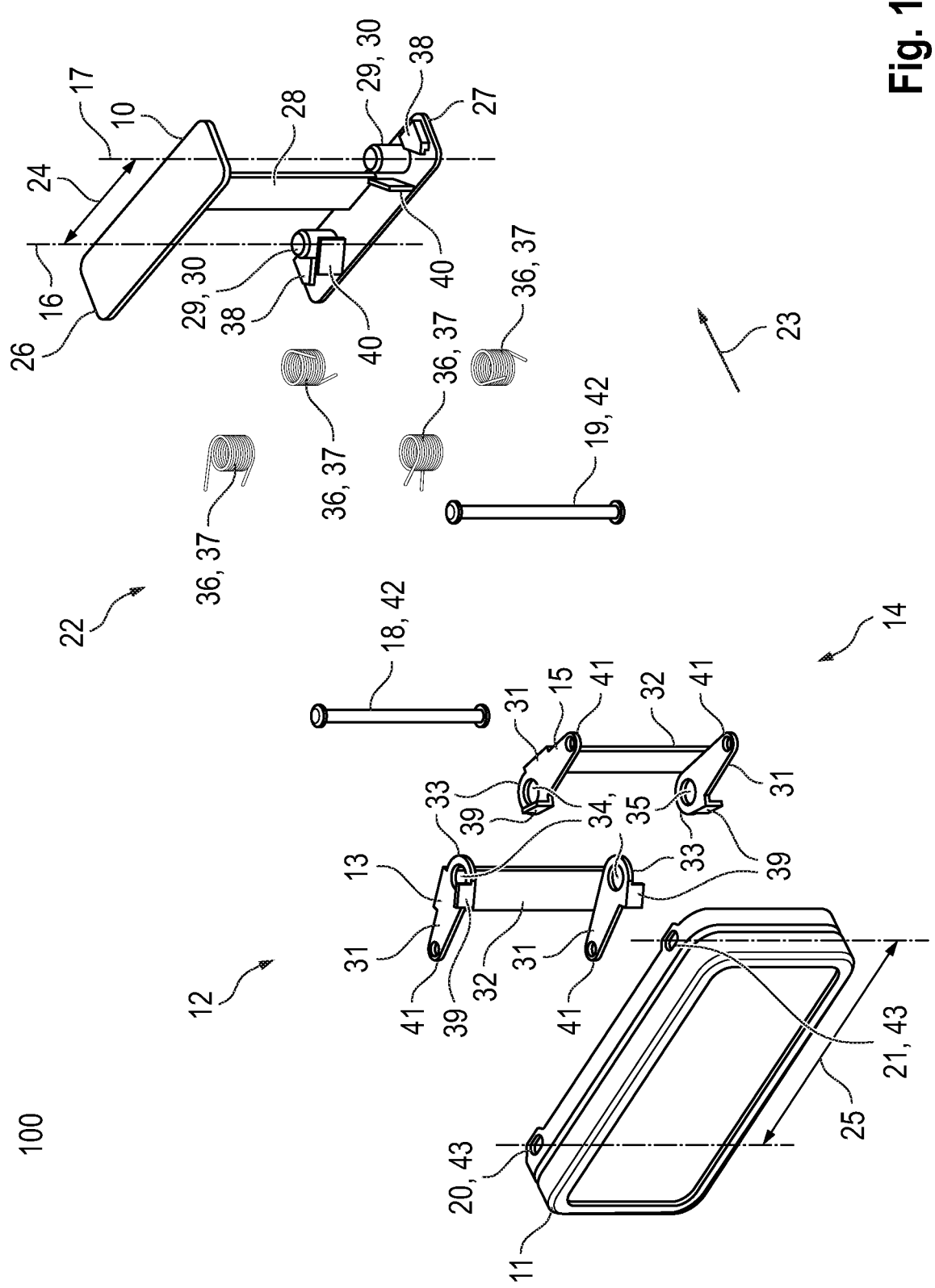
FIG. 1 illustrates an exploded view of a holding device, according to some aspects of the present disclosure.
Figure 2:
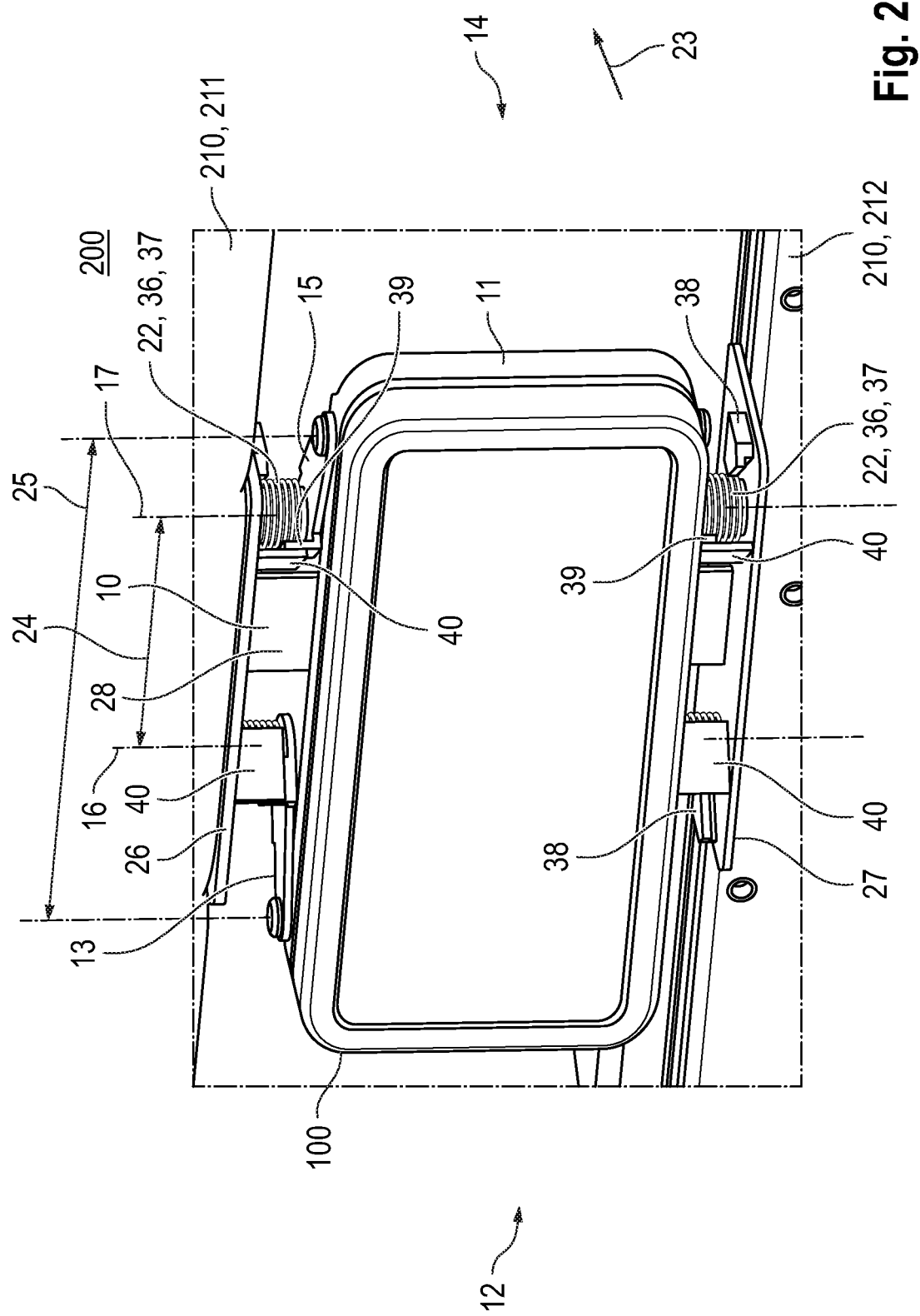
FIG. 2 illustrates a perspective front view of the holding device in a usage position, according to some aspects of the present disclosure.
Figure 3:
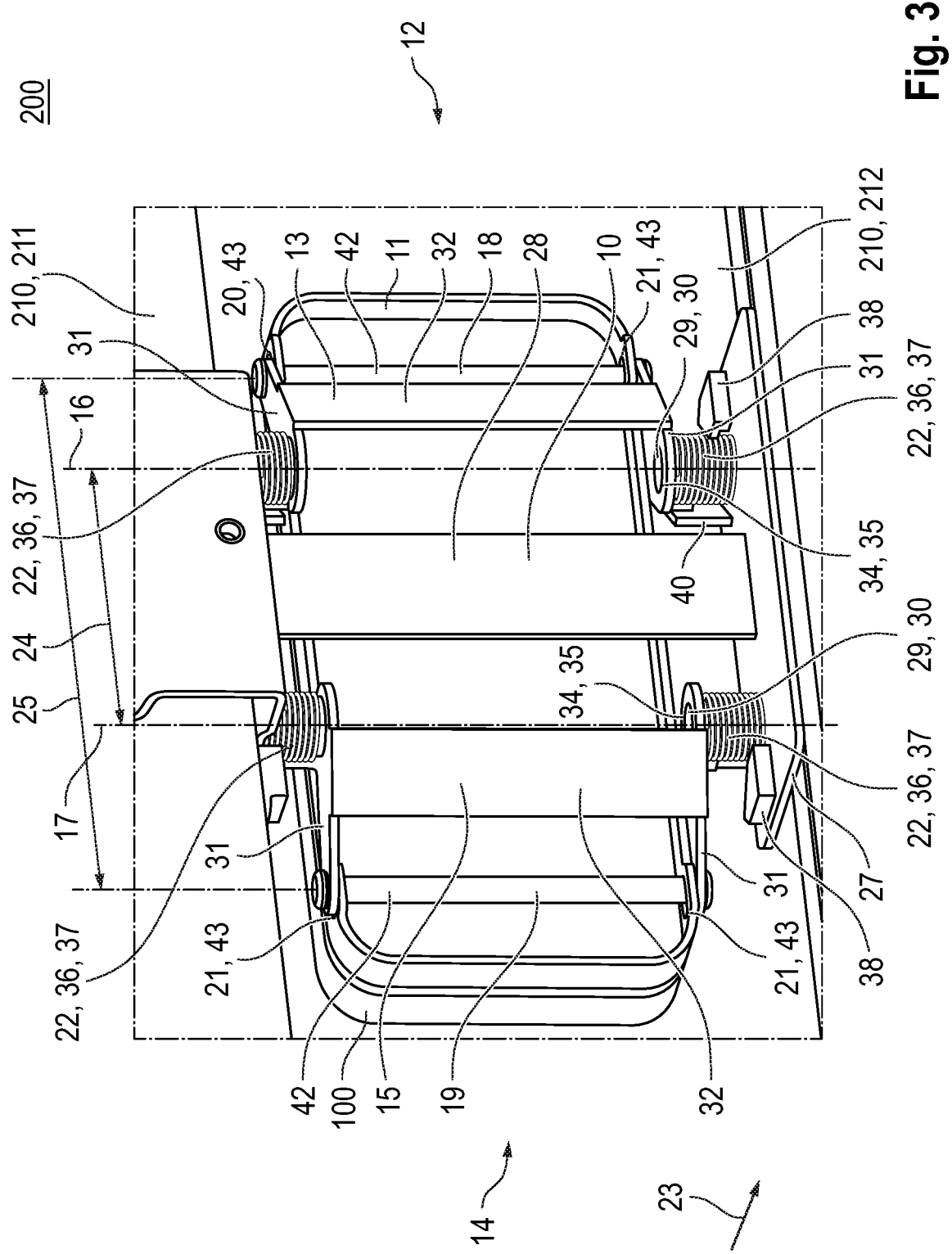
FIG. 3 illustrates a perspective rear view of the holding device in the usage position, according to some aspects of the present disclosure.
Figure 4:
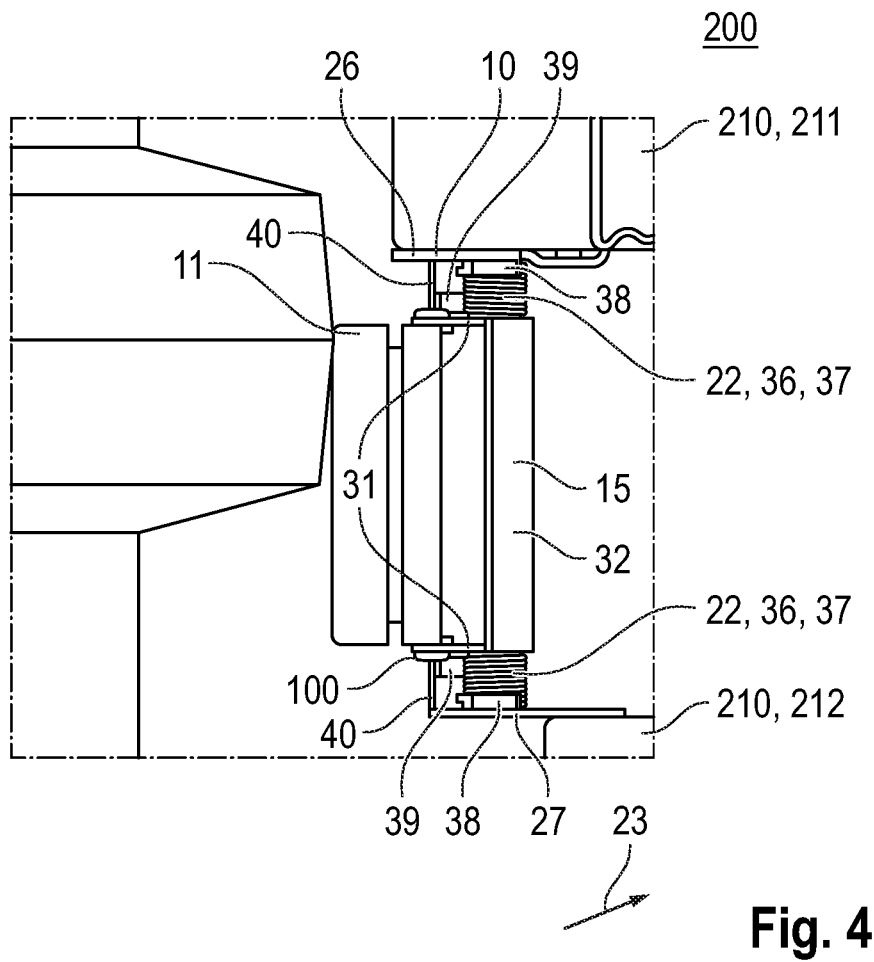
FIG. 4 illustrates a side view of the holding device in the usage position, according to some aspects of the present disclosure.
Figure 5:
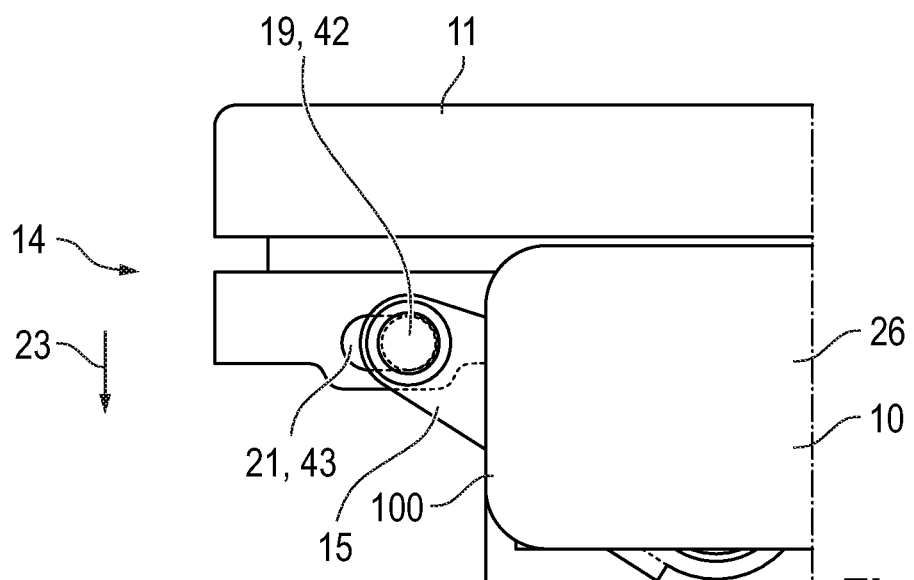
FIG. 5 illustrates a top view of the holding device in the usage position, according to some aspects of the present disclosure.
Figure 6:
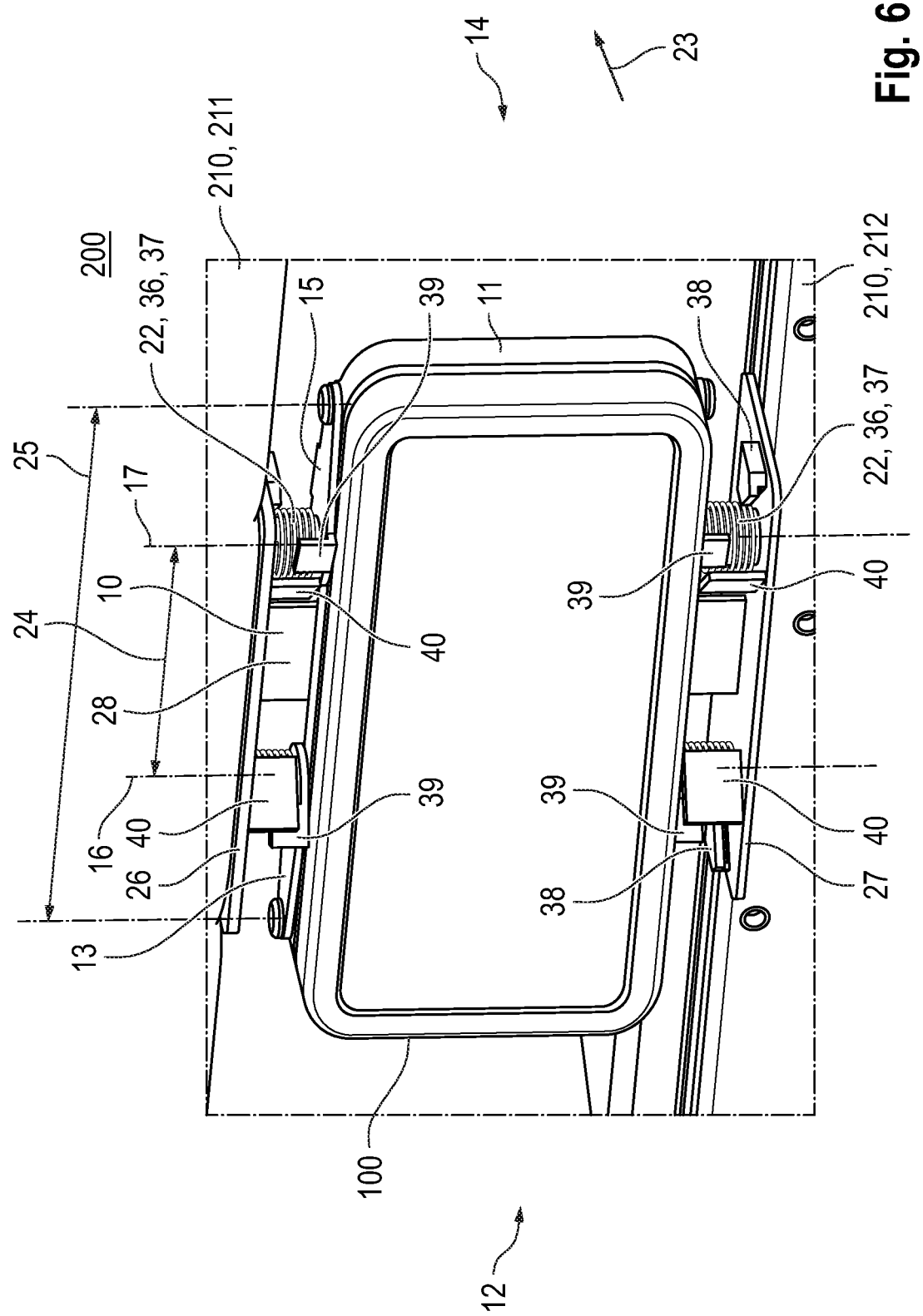
FIG. 6 illustrates a perspective front view of the holding device with a lowered sensor holder, according to some aspects of the present disclosure.
Figure 7:
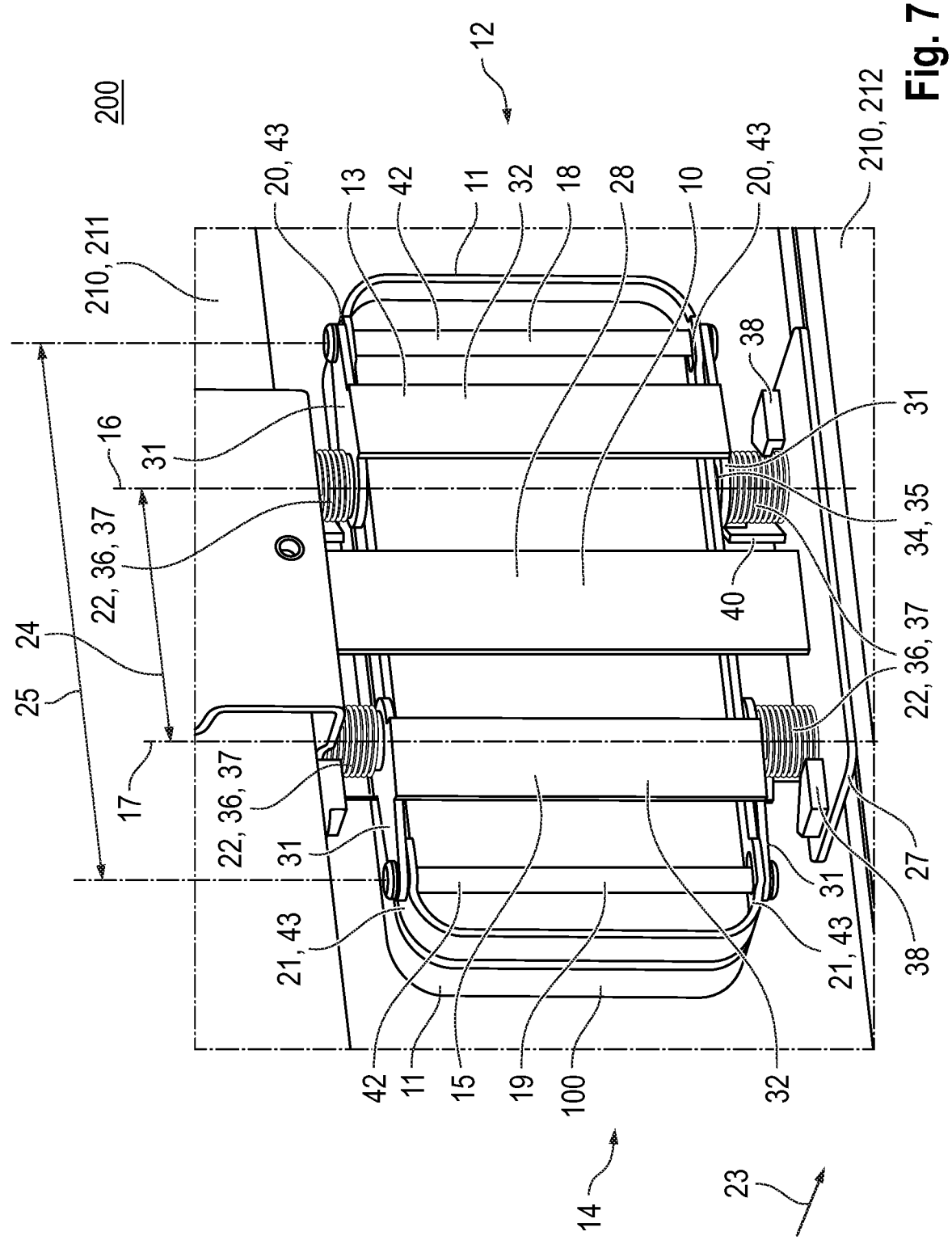
FIG. 7 illustrates a perspective rear view of the holding device with the lowered sensor holder, according to some aspects of the present disclosure.
Figure 8:
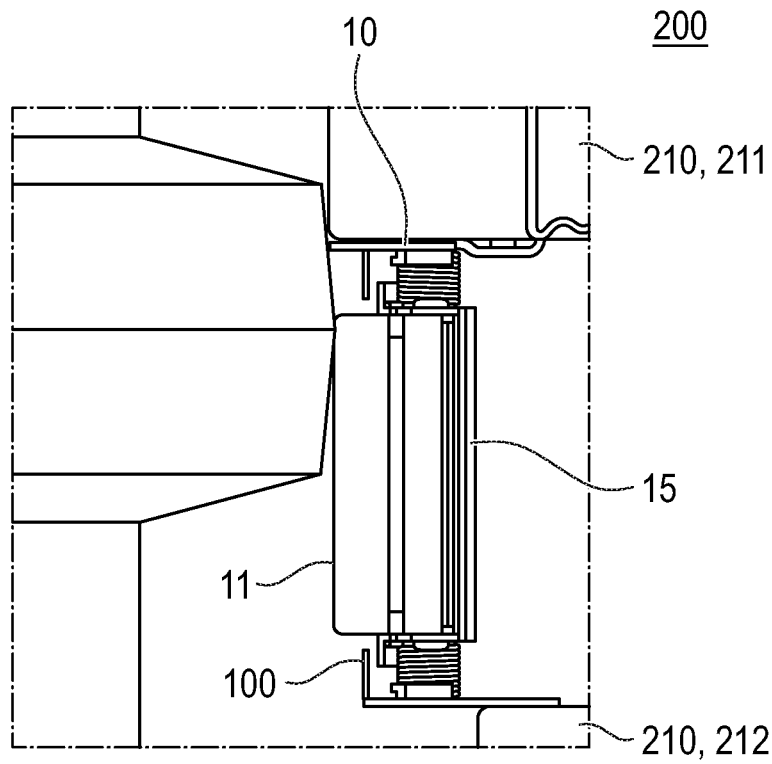
FIG. 8 illustrates a side view of the holding device with the lowered sensor holder, according to some aspects of the present disclosure.
Figure 9:
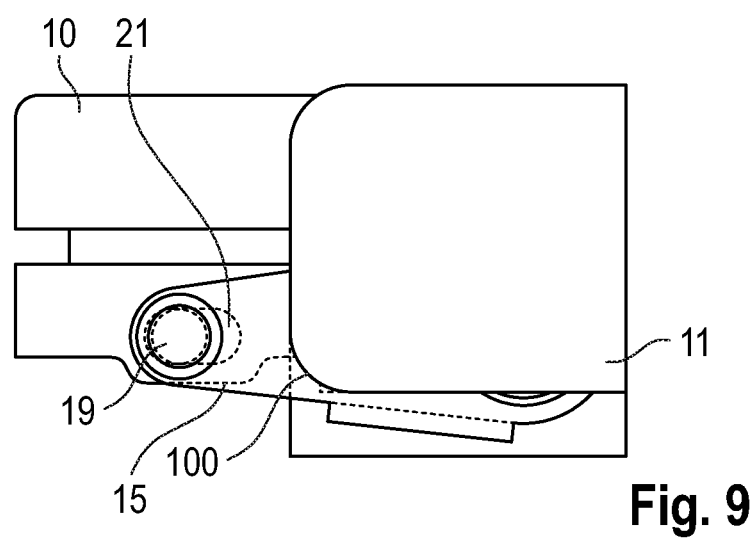
FIG. 9 illustrates a top view of the holding device with the lowered sensor holder, according to some aspects of the present disclosure.

When used as intended, the holding device disclosed herein may be attached to a structural element of the motor vehicle. The structural element can be a cross member or a lower load plane of the motor vehicle. The holding device can be simultaneously attached to the cross member and to the lower load plane; however, it is also conceivable that the holding device is only attached to the cross member or only to the lower load plane. Furthermore, the holding device can be attached to the front or to the rear of the motor vehicle. A lateral or laterally offset attachment of the holding device to the motor vehicle is also possible, so that the holding device or the sensor holder can accommodate corner sensors.

To simplify the description without limiting the general nature, hereafter a "use" as intended or an "installation" as intended should be understood as an attachment to the front of a motor vehicle. It should be understood that the present disclosure also encompasses uses or installation situations at the rear or at the vehicle corners. Terms such as "top," "bottom," "right," "left", "front," "rear" or related terms refer to the installation situation of the holding device in a motor vehicle as intended, that is, when the holding device is attached by way of the frame to a structural element of the motor vehicle at the front of the motor vehicle. These terms should be understood accordingly for the other conceivable installation positions.

In some examples, a frame that can be attached to the structural element of the motor vehicle has a first side and a second side. In the installation of the holding device, the first side, as viewed in a vehicle direction corresponding to a forward-driving direction, can correspond to the right side, so that the second side corresponds to the left side. At the first side of the frame, and at the second side of the frame, a respective pivoting bracket is mounted so as to be pivotable about a respective pivot axis. The pivoting brackets are preferably configured so as to be pivotable individually or collectively with respect to the frame.

The sensor holder may be attached to the frame by way of the first pivoting bracket and the second pivoting bracket. For this purpose, the first pivoting bracket comprises a first guide element, which is accommodated in at least one first guiding receptacle of the sensor holder, and the second pivoting bracket comprises a second guide element, which is accommodated in at least one second guiding receptacle of the sensor holder.

The frame can define a frame plane. In the usage position, the sensor holder is then pushed out of the frame plane defined by the frame by the pivoting brackets that are pre-tensioned by means of the pre-tensioning mechanism, that is, a sensor holder plane defined by the sensor holder is located parallel to and spaced apart from the frame plane.

In the installation of the holding device at the motor vehicle as intended, the sensor holder, when in the usage position, is preferably located in front of the frame or in front of the frame plane, as viewed in the vehicle direction of the motor vehicle corresponding to the forward-driving direction. When a predetermined force is applied, which, for example, can occur during impact at a low speed, for example in the case of dents incurred while parking, the pre-tension applied by the pre-tensioning mechanism onto the first and second pivoting brackets can be overcome. The first pivoting bracket and the second pivoting bracket pivot individually or collectively, and the sensor holder mounted thereon is lowered along the movement direction in the direction of the frame, preferably into the frame plane, or yields. The movement direction thus essentially corresponds to the direction opposite the vehicle direction and preferably extends approximately perpendicularly to the frame plane spanned by the frame. This lowering or yielding of the sensor holder protects the sensors mounted at the sensor holder against damage. Moreover, this prevents the sensors from becoming displaced, in particular with respect to the orientation thereof. This enables greater freedoms of design for the motor vehicle, and in particular shorter vehicle overhangs can be implemented since larger vehicle overhangs for protecting the sensors and for absorbing the impact-related deformation are no longer necessary.

Preferably, it may be provided that, after the predetermined force has been eliminated, the pre-tensioning mechanism pre-tensions the first pivoting bracket and the second pivoting bracket back into the usage position so that the sensor holder is moved back again counter to the movement direction, preferably out of the frame plane of the frame.

The first pivot axis and the second pivot axis are situated at a first distance with respect to one another. Likewise, the at least one first guiding receptacle and the at least one second guiding receptacle of the sensor holder are arranged at a second distance with respect to one another. In the installation situation as intended, the first distance and the second distance are preferably measured transversely to the movement direction.

According to the invention, it is provided that the first distance between the first pivot axis and the second pivot axis is smaller than the second distance between the at least one first guiding receptacle and the at least one second guiding receptacle.

This may mean that the first pivoting bracket and the second pivoting bracket essentially pivot apart when the sensor holder, due to the application of the predetermined force, is lowered along the movement direction in the direction of the frame.

Preferably, the first pivot axis and the second pivot axis, more preferably the first pivoting bracket and the second pivoting bracket, are arranged behind the sensor holder, as viewed in the movement direction.

In other words, the first pivot axis and the second pivot axis, preferably the first pivoting bracket and the second pivoting bracket, are not situated laterally from the sensor holder. The lateral dimensions of the holding device are thus reduced. If the holding device is arranged in the region of a grille of a vehicle radiator, a larger ventilation cross-section remains.

It is preferably provided that the first pivot axis and the second pivot axis extend parallel to one another.

More preferably, it is provided that the pre-tensioning mechanism comprises at least one, preferably two spring elements assigned to the first pivoting bracket and at least one, preferably two spring elements assigned to the second pivoting bracket.

Each of the pivoting brackets is thus preferably pre-tensioned by at least one assigned spring element. As a result of the pre-tension of the first pivoting bracket and the second pivoting bracket, the sensor holder is pre-tensioned into the usage position, preferably out of the frame plane.

Further advantageously, it may be provided that the at least one spring element assigned to the first pivoting bracket and the at least one spring element assigned to the second pivoting bracket are torsion springs.

Further advantageously, it may be provided that the frame comprises a first, in particular upper, transverse element and a second, in particular lower, transverse element, wherein the first transverse element and the second transverse element are preferably connected to one another by means of, preferably exactly, one longitudinal element, wherein more preferably the longitudinal element is connected centrally to the first transverse element and the second transverse element.

The frame thus approximately has the shape of an "H" rotated by 90° in the installation situation as intended. During installment, the longitudinal element may be approximately vertically oriented and is in each case centrally connected to the first transverse element and the second transverse element. This reduces the material use for the frame, while ensuring sufficient rigidity of the frame.

Further advantageously, it may be provided that the first transverse element and the second transverse element of the frame each at the first side comprise a bearing element assigned to the first pivoting bracket, in particular a bearing pin, preferably having a connecting pin receptacle, and each at the second side comprise a bearing element assigned to the second pivoting bracket, in particular a bearing pin, preferably having a connecting pin receptacle.

The first transverse element and the second transverse element preferably each extend from the first side of the frame to the second side of the frame. In each case, a bearing element assigned to the first pivoting bracket is provided at the respective first side of the first transverse element and of the second transverse element. Likewise, in each case, a bearing element assigned to the second pivoting bracket is provided at the second side of the first transverse element and the second transverse element. In the intended installation situation at the structural element of the motor vehicle, the first pivoting bracket and the second pivoting bracket are thus mounted in the vertical direction between the upper transverse element and the second transverse element and can each be pivoted about the bearing elements assigned to the first pivoting bracket and the bearing elements assigned to the second pivoting bracket.

The bearing elements that are preferably configured as bearing pins can additionally have a connecting pin receptacle. Depending on the manner in which the first pivoting bracket and the second pivoting bracket are attached to the respective bearing elements, in particular to the bearing pins, the first pivoting brackets and the second pivoting brackets can either encompass or enclose or surround the bearing elements or be placed onto the bearing elements or, if a connecting pin receptacle is provided, can be inserted into the bearing pin receptacle.

If the first pivoting bracket and the second pivoting bracket comprise connecting pins, which are inserted into the connecting pin receptacles of the bearing elements, screws or rivets may additionally be provided, by means of which the connecting pins are prevented from sliding out of the connecting pin receptacles.

Furthermore, the mount of the pivoting brackets can comprise rolling or sliding bearings. The rolling or sliding bearings can be provided at the bearing elements, in particular at the bearing pins.

In some examples, the first pivoting bracket and the second pivoting bracket each comprise at least one cantilever, preferably two cantilevers, wherein the at least one cantilever, preferably the two cantilevers, in each case at a first end comprises or comprise a bearing complement, preferably an opening or a connecting pin, wherein more preferably the first guide element and the second guide element are arranged at a second end, located opposite the bearing complement, of the cantilever, preferably of the two cantilevers, of the respective pivoting bracket.

The cantilever is, or the cantilevers are, preferably oriented perpendicularly to the first pivot axis and to the second pivot axis. When the pivoting brackets are pivoted, the cantilevers thus pivot about the pivot axis. A bearing complement is provided at a first end of the respective cantilever. The bearing complement can be configured as an opening, which is placed onto the bearing element of the respective transverse element which is preferably configured as a bearing pin. The bearing element, in particular the bearing pin, is then arranged within the opening of the respective cantilever. If necessary, a sliding or rolling bearing can be provided. As an alternative or in addition, the cantilever can also comprise a connecting pin, which is inserted into the connecting pin receptacle of the bearing element, in particular of the respective bearing pin.

The guide elements are arranged at the second end of the respective cantilever located opposite the first end. The first guide element and the second guide element are, in turn, accommodated in the at least one first guiding receptacle or the at least one second guiding receptacle of the sensor holder.

In some examples, the first pivoting bracket and the second pivoting bracket each comprise two cantilevers, wherein the two cantilevers of the respective pivoting bracket are connected to one another by means of a connecting sheet.

During the installation of the holding device at the structural element of the motor vehicle, the first cantilever of the respective pivoting bracket is arranged at the top, and the second cantilever of the respective pivoting bracket is arranged at the bottom. So as to stabilize the pivoting brackets, the respective two cantilevers of the respective pivoting bracket are connected to one another by means of a connecting sheet.

It is preferably provided that the spring elements assigned to the first pivoting bracket and the spring elements assigned to the second pivoting bracket are in each case arranged at the bearing elements assigned to the first pivoting bracket and the second pivoting bracket.

If the spring elements are configured as torsion springs, these can in particular enclose the bearing elements, which are preferably configured as bearing pins.

Preferably, it is provided that abutments for the spring elements are provided at the first pivoting bracket and at the second pivoting bracket, in particular at the cantilever or cantilevers of the first pivoting bracket and of the second pivoting bracket.

The pre-tensioning force applied by the spring elements can be transferred to the pivoting brackets via the abutments for the spring elements so that these are pre-tensioned into the usage position.

Furthermore, it may preferably be provided that abutment stops for the abutments of the pivoting brackets are provided at the frame, preferably at the first and second transverse elements.

The first pivoting bracket and the second pivoting bracket are pre-tensioned and pivoted into the usage position by the spring elements, which preferably bear against the abutments of the pivoting brackets. The pivoting of the first pivoting bracket and of the second pivoting bracket is thus limited by abutment stops for the abutments of the pivoting brackets at the frame. In other words, the first pivoting bracket and the second pivoting bracket are pre-tensioned by the spring elements into the usage position until the abutments of the pivoting brackets strike against the abutment stops of the frame. As a result of the abutments of the pivoting brackets bearing against the abutment stops of the frame, undesirable torsion of the sensor holder about an axis that, in the installation situation as intended, extends vertically, can be prevented, which could otherwise occur if the spring elements have unequal spring tensioning forces. Moreover, the spring tensioning forces can be selected to be so great that oscillations, vibrations or acceleration occurring during the driving operation of the motor vehicle do not result in the sensor holder being displaced or pivoted.

Preferably, it is therefore provided that the abutments of the pivoting brackets bearing against the abutment stops prevent a torsion of the sensor holder about a vertical axis due to forces which are lower than the predetermined force. In other words, spring abutments for the spring elements may be provided at the frame, preferably at the first and second transverse elements.

In some examples, the spring elements, in particular the torsion springs, arranged at the bearing elements of the first transverse element and of the second transverse element, are then supported at the spring abutments of the first transverse element and of the second transverse element. Furthermore, the spring elements are supported at the abutments of the first pivoting bracket and of the second pivoting bracket. The spring elements, in particular the torsion springs, are thus arranged between the spring abutments of the frame and the abutments of the pivoting brackets in terms of the force so as to pre-tension the pivoting brackets into the usage position. The pivoting of the pivoting brackets is preferably limited by the abutments striking against the abutment stops of the frame.

Furthermore, the first guide element and the second guide element each may comprise a guide rod, or the first guide element and the second guide element may each comprise at least one pin, preferably two pins.

If the guide elements are configured as guide rods, the respective guide rod can run parallel to the pivot axis of the respective pivoting bracket and extend between the second ends of the cantilevers of the respective pivoting bracket. The guide rods can furthermore extend through the guiding receptacles of the sensor holder. Preferably, two first guiding receptacles for accommodating the guide rod of the first pivoting bracket and two second guiding receptacles for accommodating the guide rod of the second pivoting bracket are provided in the sensor holder.

As an alternative, it may be provided that the guide elements in each case comprise a pin, preferably at least two pins. The pins may also be arranged at the second ends of the cantilevers, which are located opposite the bearing complement, and are accommodated in the guiding receptacles of the sensor holder. The first pivoting bracket and the second pivoting bracket can each comprise two guide elements configured as pins, one of which is arranged in each case at the second end of the first cantilever located opposite the bearing complement, and one is arranged at the second end of the second cantilever located opposite the bearing complement. Each of the pins is, in turn, arranged in one of the two first guiding receptacles or in one of the two second guiding receptacles of the sensor holder. In this variant, individual mounting of the sensor holder at the cantilevers of the first pivoting bracket and of the second pivoting bracket is provided.

Preferably, it is provided that the at least one first guiding receptacle and the at least one second guiding receptacle are configured as elongated holes, wherein the first guide element and the second guide element can slide in the at least one first guiding receptacle and the at least one second guiding receptacle when the sensor holder is lowered.

If, due to impact at low speed, a force acts on the sensor holder, the force is transferred via the guide elements, to which the sensor holder is attached, to the pivoting brackets. If the force exceeds the predetermined force, the pivoting brackets pivot apart and out of the usage position, and the sensor holder is lowered in the movement direction in the direction of the plane of the frame. As a result, the distance between the guide elements of the first pivoting bracket and the guide elements of the second pivoting brackets increases. So as to make this increase in distance possible, the guiding receptacles are preferably configured as elongated holes.

Preferably, it is also possible for linear mounts to be provided for mounting the guide elements in the guiding receptacles so as to reduce the friction.

Turning to FIG. 1, the drawing illustrates an exploded view of a holding device 100 for a motor vehicle sensor system. FIGS. 2 to 5 show the holding device 100 in various views in a usage position. FIGS. 6 to 9 show the holding device 100 when a predetermined force is acting.

The holding device 100 comprises a frame 10 that can be attached to a structural element 210 of a motor vehicle 200, which is only shown in sections, (FIGS. 2 to 9) and a sensor holder 11 configured to mount sensors. The structural element 210 can comprise a cross member 211 and a lower load plane 212. The frame 10 comprises a first pivoting bracket 13 at a first side 12 and a second pivoting bracket 15 at a second side 14. The first pivoting bracket 13 is mounted at the frame 10 so as to be pivotable about a first pivot axis 16, and the second pivoting bracket 15 is mounted at the frame 10 so as to be pivotable about a second pivot axis 17. The first pivoting bracket 13 comprises a first guide element 18.

The second pivoting bracket 15 comprises a second guide element 19. The first guide element 18 is accommodated in first guiding receptacles 20 of the sensor holder 11, and the second guide element 19 is accommodated in second guiding receptacles 21 of the sensor holder 11. Furthermore, a pre-tensioning mechanism 22 is provided, which is configured to pre-tension the first pivoting bracket 13 and the second pivoting bracket 15 into a usage position. The pre-tension of the pre-tensioning mechanism 22 can be overcome by applying a predetermined force onto the sensor holder 11 so that the sensor holder 11 can be lowered along a movement direction 23 in the direction of the frame 10. The first pivot axis 16 and the second pivot axis 17 are arranged at a first distance 24. The first guiding receptacles 20 and the second guiding receptacles 21 are arranged at a second distance 25 with respect to one another. The first distance 24 is smaller than the second distance 25.

The frame 10 comprises a first, upper transverse element 26 and a second, lower transverse element 27, which are connected to one another via a longitudinal element 28. Bearing elements 29, in the form of bearing pins 30, for the first pivoting bracket 13 are provided at the respective first side 12 of the first transverse element 26 and of the second transverse element 27. Bearing elements 29, configured as bearing pins 30, for the second pivoting bracket 15 are provided at the respective second side 14 of the first transverse element 26 and of the second transverse element 27.

Each of the pivoting bracket 13, 15 comprises two cantilevers 31. The two cantilevers 31 of each pivoting bracket 13, 15 are connected to one another via a connecting sheet 32. Each of the cantilevers 31 comprises a bearing complement 34 in the form of an opening 35 at a first end 33. The pivoting brackets 13, 15 are mounted at the frame 10 in that the openings 35 are placed onto the bearing pins 30.

Figure 10:
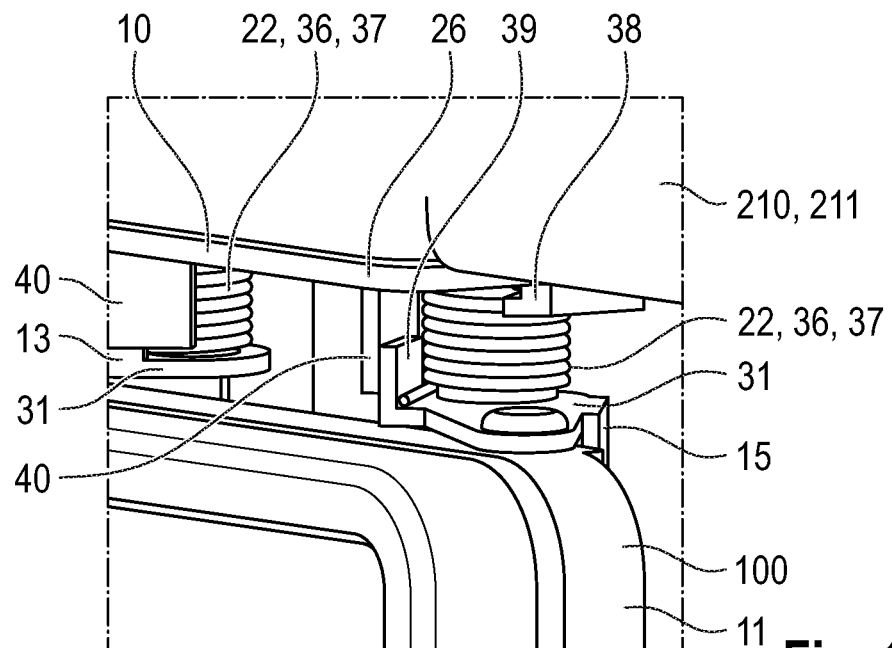
FIG. 10 illustrates a detailed view of a pre-tensioning mechanism in the usage position, according to some aspects of the present disclosure.
Figure 11:
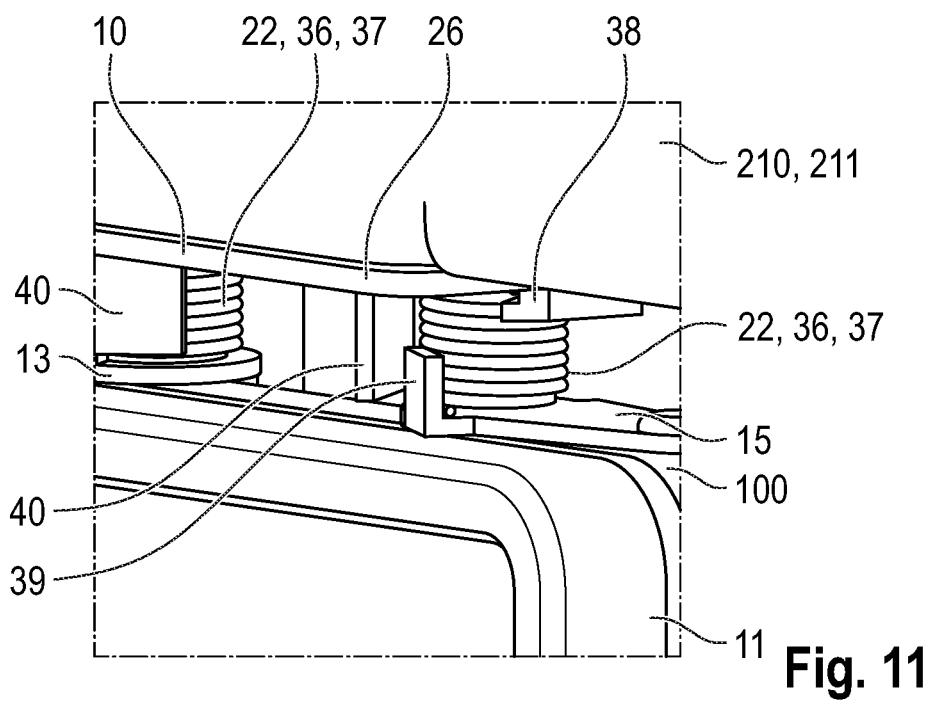
FIG. 11 illustrates a detailed view of the pre-tensioning mechanism with the lowered sensor holder, according to some aspects of the present disclosure.

Detailed views of the pre-tensioning mechanism 22 are shown FIGS. 10 and 11. The pre-tensioning mechanism 22 comprises spring elements 36 in the form of torsion springs 37, which are likewise placed onto the bearing pin 30. The torsion springs 37 are supported on spring abutments 38 of the frame 10. The torsion springs 37 furthermore bear against abutments 39 of the pivoting brackets 13, 15, whereby the pivoting brackets 13, 15 are pre-tensioned into the usage position of FIGS. 2 to 5. In addition, abutment stops 40 for the abutments 39 of the pivoting brackets 13, 15 are provided at the frame 10, which limit the pivoting motion of the pivoting brackets 13, 15. In the usage position, the spring elements 36 pre-tension the first pivoting bracket 13 and the second pivoting bracket 15 in such a way that the abutments 39 of the pivoting brackets 13, 15 strike against the abutment stops 40 of the frame 10, and thus fix the sensor holder 11 in the usage position and prevent undesirable torsion.

Guide elements 18, 19 are arranged at the second ends 41 of the cantilevers 31 of the pivoting levers 13, 15. In the case of the holding device 100 of FIGS. 1 to 9, the guide elements 18, 19 are configured as guide rods 42. The guide rod 42 of the first pivoting lever 13 is accommodated in the first guiding receptacles 20 of the sensor holder 11. The guide rod 42 of the second pivoting lever 15 is accommodated in the second guiding receptacles 21 of the sensor holder 11. The guiding receptacles 20, 21 are each configured as elongated holes 43 so that the guide rods 42 can slide within the elongated holes 43. When a predetermined force is exerted on the sensor holder 11, the sensor holder 11 is lowered in the movement direction 23 in the direction of the frame 10. The first pivoting bracket 13 and the second pivoting bracket 15 pivot apart in the process. To prevent blockages, the guide rods 42 can slide outwardly in the elongated holes 43.

FIGS. 2 to 5 show the holding device 100 in the usage position in which the sensor holder 11 is arranged in front of the frame 10. When a predetermined force acts on the sensor holder 11, the sensor holder is lowered in the movement direction 13 in the direction of the frame 10. The holding device including a lowered sensor holder is shown in FIGS. 6 to 9. When the predetermined force is eliminated, the sensor holder 11 is again pre-tensioned into the usage position.

Figure 12:
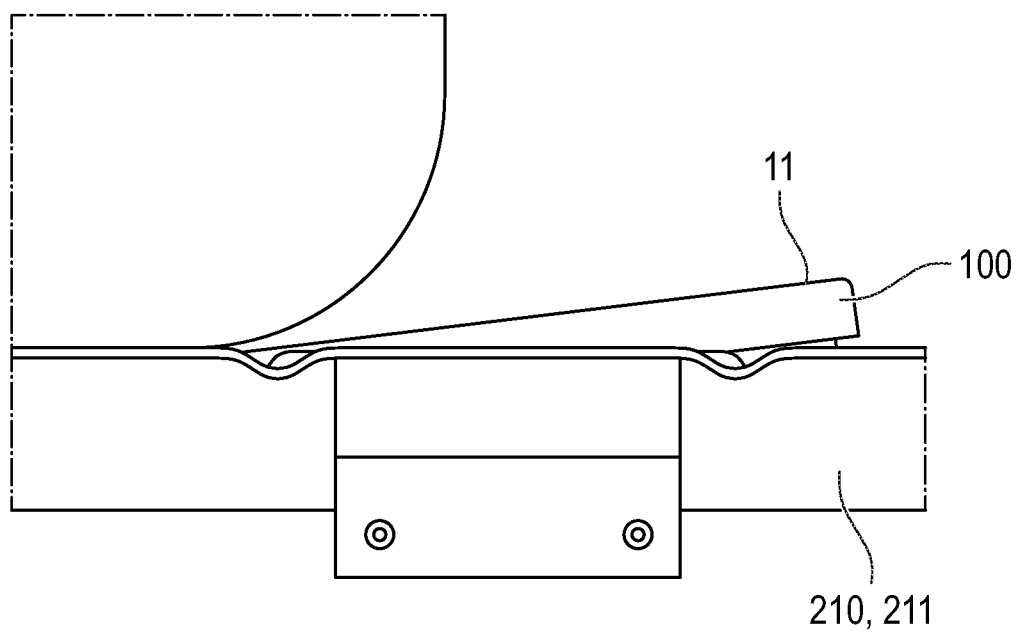
FIG. 12 illustrates a top view of the holding device with a sensor holder lowered on one side, according to some aspects of the present disclosure.

The first pivoting bracket 13 and the second pivoting bracket 15 can also be pivoted independently of one another. This is shown in FIGS. 12 and 13.

Figure 13:
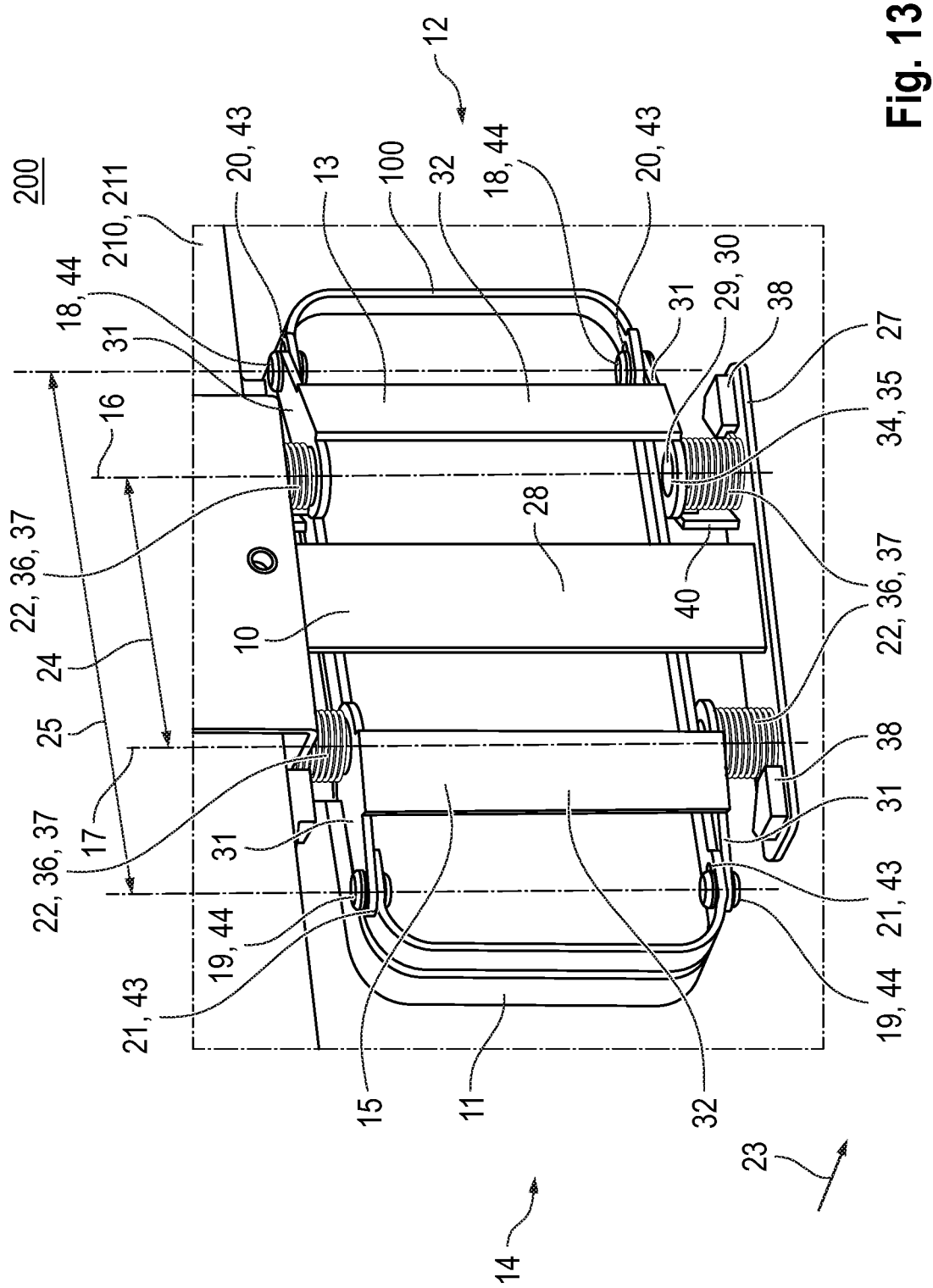
FIG. 13 illustrates a perspective rear view of a further holding device in the usage position, according to some aspects of the present disclosure.

FIG. 13 shows another embodiment of the holding device 100. The holding device 100 according to FIG. 13 is substantially identical to the holding device 100 according to FIGS. 1 to 12, with the difference that the guide elements 18, 19 are not configured as guide rods 42, but each comprise two pins 44, which are each individually slidably accommodated in the guiding receptacles 20, 21 of the sensor holder 11 configured as elongated holes 43.

Figure 14:
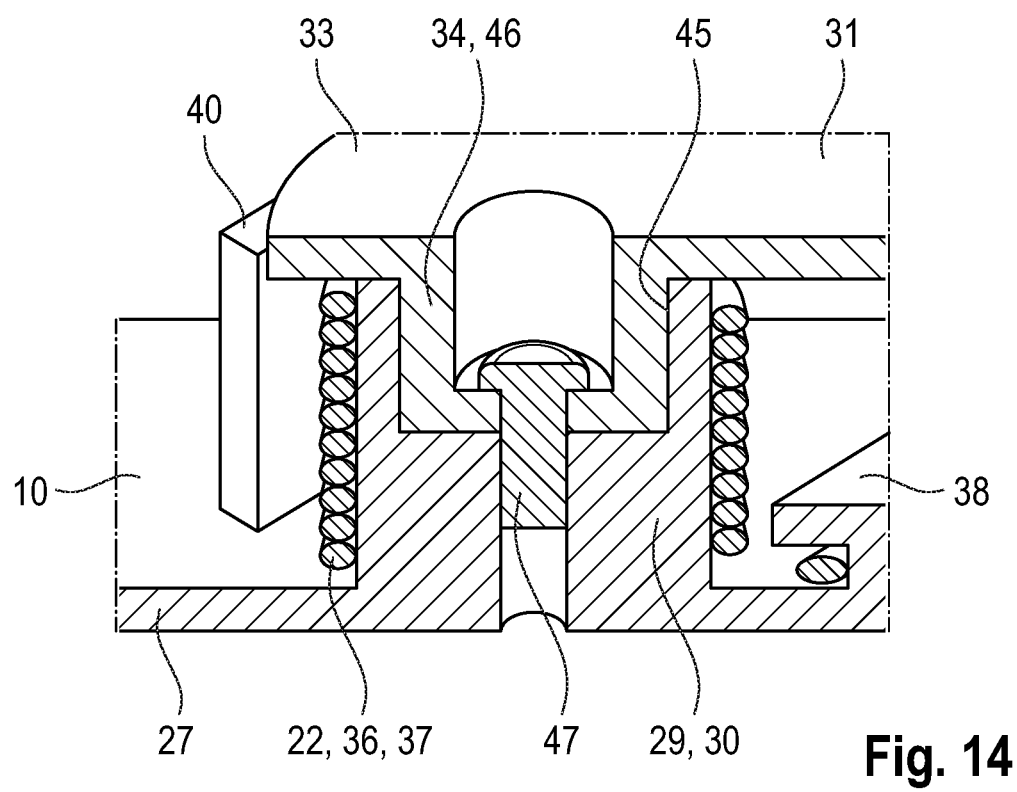
FIG. 14 illustrates a detailed view of a bearing element, according to some aspects of the present disclosure.

The detailed view of FIG. 14 shows another variant of the bearing element 29 and of the bearing complement 34. The bearing element 29 is configured as a bearing pin 30 having a connecting pin receptacle 45. The bearing complement 34 of the cantilevers 31 is configured as a connecting pin 46, which engages in the connecting pin receptacle 45 of the bearing pin 30. A screw or a rivet 47 is provided for securing the connecting pin 46 in the connecting pin receptacle 45.

LIST OF REFERENCE NUMERALS 100 holding device
10 frame
11 sensor holder
12 first side
13 first pivoting bracket
14 second side
15 second pivoting bracket
16 first pivot axis
17 second pivot axis
18 first guide element
19 second guide element
20 first guiding receptacle
21 second guiding receptacle
22 pre-tensioning mechanism
23 movement direction
24 first distance
25 second distance
26 first transverse element
27 second transverse element
28 longitudinal element
29 bearing element
30 bearing pin
31 cantilever
32 connecting sheet
33 first end
34 bearing complement
35 opening
36 spring element
37 torsion spring
38 spring abutment
39 abutment
40 abutment stop
41 second end
42 guide rod 43 elongated hole
44 pin
45 connecting pin receptacle
46 connecting pin
47 rivet
200 motor vehicle
210 structural element
211 cross member
212 lower load plane

The invention claimed is:

1. A holding device for a motor vehicle sensor system, comprising:
a frame coupled to a structural element of a motor vehicle and a sensor holder;
a first pivoting bracket mounted at a first side of the frame so as to be pivotable about a first pivot axis;
a second pivoting bracket mounted at a second side of the frame, opposite the first side so as to be pivotable about a second pivot axis, wherein a first guide element of the first pivoting bracket is configured in at least one first guiding receptacle of the sensor holder, and a second guide element of the second pivoting bracket is configured in at least one second guiding receptacle of the sensor holder; and
a pre-tensioning mechanism, configured to pre-tension the first pivoting bracket and the second pivoting bracket into a usage position, wherein the pre-tension is configured to be overcome by applying a predetermined force onto the sensor holder so that the sensor holder can be lowered along a movement direction in the direction of the frame, wherein a first distance between the first pivot axis and the second pivot axis is smaller than a second distance between the at least one guiding receptacle and the at least one second guiding receptacle.

2. The holding device according to claim 1, wherein the pre-tensioning mechanism comprises one or more first spring elements assigned to the first pivoting bracket and one or more second spring elements assigned to the second pivoting bracket.

3. The holding device according to claim 2, wherein the first spring elements and second spring elements are torsion springs.

4. The holding device according to claim 1, wherein the frame comprises a first upper transverse element and a second lower transverse element, the first upper transverse element and the second lower transverse element being coupled to one another via one longitudinal element.

5. The holding device according to claim 4, wherein the longitudinal element is coupled centrally to the first transverse element and the second transverse element.

6. The holding device according to claim 4, wherein the first upper transverse element and the second lower transverse element of the frame, at a respective first side comprise a first bearing element assigned to the first pivoting bracket, and at a respective second side comprise a second bearing element assigned to the second pivoting bracket.

7. The holding device according to claim 6, wherein the first bearing element and second bearing element comprise a bearing pin and connecting pin receptacle.

8. The holding device according to claim 1, wherein the first pivoting bracket and the second pivoting bracket each comprise one or more cantilevers, each cantilever comprising, at a first end, a bearing complement, and wherein the first guide element and the second guide element are arranged at a second end located opposite the first end bearing complement.

9. The holding device according to claim 1, wherein the first pivoting bracket and the second pivoting bracket each comprise two cantilevers, and wherein the two cantilevers of each respective pivoting bracket are connected to one another via a connecting sheet.

10. The holding device according to claim 2, wherein the first spring elements assigned to the first pivoting bracket and the second spring elements assigned to the second pivoting bracket are in each case configured at a bearing element assigned to the first pivoting bracket and the second pivoting bracket.

11. The holding device according to claim 2, wherein the first and second spring elements comprise
abutments at the first pivoting bracket at one or more cantilevers of the first pivoting bracket and of the second pivoting bracket, and
abutment stops, configured such that the abutments of the pivoting brackets bear against the abutment stops to prevent a torsion of the sensor holder about a vertical axis due to forces that are lower than the predetermined force.

12. The holding device according to claim 2, further comprising spring abutments for the spring elements configured on the frame at a first transverse element and a second transverse element.

13. The holding device according to claim 1, wherein
the first guide element and the second guide element each comprise a guide rod, or
the first guide element and the second guide element each comprise at least one or more pins.

14. The holding device according to claim 1, wherein the at least one first guiding receptacle and the at least one second guiding receptacle are configured as elongated holes, the first guide element and the second guide element being configured to slide in the at least one first guiding receptacle and the at least one second guiding receptacle when the sensor holder is lowered.

15. A motor vehicle, comprising:
a holding device for a motor vehicle sensor system, the holding device comprising
a frame coupled to a structural element of a motor vehicle and a sensor holder;
a first pivoting bracket mounted at a first side of the frame so as to be pivotable about a first pivot axis;
a second pivoting bracket mounted at a second side of the frame, opposite the first side so as to be pivotable about a second pivot axis, wherein a first guide element of the first pivoting bracket is configured in at least one first guiding receptacle of the sensor holder, and a second guide element of the second pivoting bracket is configured in at least one second guiding receptacle of the sensor holder; and
a pre-tensioning mechanism, configured to pre-tension the first pivoting bracket and the second pivoting bracket into a usage position, wherein the pre-tension is configured to be overcome by applying a predetermined force onto the sensor holder so that the sensor holder can be lowered along a movement direction in the direction of the frame, wherein a first distance between the first pivot axis and the second pivot axis is smaller than a second distance between the at least one guiding receptacle and the at least one second guiding receptacle.

16. The motor vehicle according to claim 15, wherein the pre-tensioning mechanism comprises one or more first spring elements assigned to the first pivoting bracket and one or more second spring elements assigned to the second pivoting bracket.

17. The motor vehicle according to claim 16, wherein the first spring elements and second spring elements are torsion springs.

18. The motor vehicle according to claim 15, wherein the frame comprises a first upper transverse element and a second lower transverse element, the first upper transverse element and the second lower transverse element being coupled to one another via one longitudinal element.

19. The motor vehicle according to claim 18, wherein the longitudinal element is coupled centrally to the first transverse element and the second transverse element.

20. A holding device for a motor vehicle sensor system, comprising:
- a frame coupled to a structural element of a motor vehicle and a sensor holder;
- a first pivoting bracket mounted at a first side of the frame so as to be pivotable about a first pivot axis;
- a second pivoting bracket mounted at a second side of the frame, opposite the first side so as to be pivotable about a second pivot axis, wherein a first guide element of the first pivoting bracket is configured in at least one first guiding receptacle of the sensor holder, and a second guide element of the second pivoting bracket is configured in at least one second guiding receptacle of the sensor holder; and
- a pre-tensioning mechanism comprising spring elements, the pre-tensioning mechanism being configured to pre-tension the first pivoting bracket and the second pivoting bracket into a usage position, wherein the pre-tension is configured to be overcome by applying a predetermined force onto the sensor holder so that the sensor holder can be lowered along a movement direction in the direction of the frame, wherein a first distance between the first pivot axis and the second pivot axis is smaller than a second distance between the at least one guiding receptacle and the at least one second guiding receptacle.

* * * * *